US010869353B2

(12) United States Patent
Byun et al.

(10) Patent No.: US 10,869,353 B2
(45) Date of Patent: Dec. 15, 2020

(54) METHOD AND APPARATUS FOR MODIFYING RADIO BEARER IN CU-DU SPLIT SCENARIO

(71) Applicant: LG Electronics Inc., Seoul (KR)

(72) Inventors: Daewook Byun, Seoul (KR); Jian Xu, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/014,390

(22) Filed: Jun. 21, 2018

(65) Prior Publication Data

US 2019/0037631 A1 Jan. 31, 2019

Related U.S. Application Data

(60) Provisional application No. 62/535,944, filed on Jul. 23, 2017.

(51) Int. Cl.
*H04W 76/25* (2018.01)
*H04W 76/20* (2018.01)
*H04W 76/11* (2018.01)

(52) U.S. Cl.
CPC ........... *H04W 76/25* (2018.02); *H04W 76/20* (2018.02); *H04W 76/11* (2018.02)

(58) Field of Classification Search
CPC ...... H04W 76/25; H04W 76/20; H04W 76/11
USPC ....................................................... 370/328
See application file for complete search history.

(56) References Cited

U.S. PATENT DOCUMENTS

| 2017/0156059 A1 | 6/2017 | Palat et al. |
| 2017/0171904 A1 | 6/2017 | Wu et al. |
| 2018/0368109 A1* | 12/2018 | Kim ................. H04W 72/0433 |
| 2018/0368205 A1* | 12/2018 | Park ..................... H04L 5/0048 |
| 2018/0376380 A1* | 12/2018 | Leroux ............ H04W 36/0011 |

FOREIGN PATENT DOCUMENTS

| JP | 2016530798 A | 9/2016 |
| KR | 1020090038752 A | 4/2009 |
| KR | 10-2012-0089270 | 8/2012 |
| KR | 10-2014-0099172 | 8/2014 |
| KR | 1020150103201 A | 9/2015 |
| KR | 10-2016-0141002 | 12/2016 |

(Continued)

OTHER PUBLICATIONS

Catt, "TP on UE context management for 38.473," 'R3-172217' 3GPP TSG-RAN WG3 NR AdHoc, Qingdao, China, Jun. 27-29, 2017, 9 pages.

(Continued)

*Primary Examiner* — Paul H Masur
*Assistant Examiner* — Ellen A Kirillova
(74) *Attorney, Agent, or Firm* — Fish & Richardson P.C.

(57) ABSTRACT

Provided are a method of modifying a radio bearer for a user equipment by a distribution unit (DU) of a base station in a wireless communication system, and an apparatus supporting the method. The method may include: deciding to modify the radio bearer for the user equipment; transmitting information on the radio bearer to a central unit (CU) of the base station; receiving information on an accepted radio bearer from the CU of the base station; and modifying the accepted radio bearer.

19 Claims, 13 Drawing Sheets

(56) References Cited

FOREIGN PATENT DOCUMENTS

WO         2016021890 A1    2/2016
WO   WO 2018/232399    12/2018

OTHER PUBLICATIONS

Jo et al., "Technical Trends of Mobile Xhaul Network (MXN)," The Magazine of the IEIE, Apr. 2017, 14 pages (with English Translation).

Mariana Goldhamer, "Towards a 5G Mobile Architecture Standardisation Update" IEEE 5G Summit, Thessaloniki, Jul. 11, 2017, 19 pages.

Huawei, "draftTS 38.470," 'R3-172492,' 3GPP TSG-RAN WG3 NR Ad hoc#2, Qingdao, China, Jun. 27-29, 2017, 9 pages.

Huawei, "draft TS38.473," 'R3-172493,' 3GPP TSG-RAN WG3 NR Ad hoc#2, Qingdao, China, Jun. 27-29, 2017, 20 pages.

Catt, "Discussion on UE Context Management", R3-172215, 3GPP TSG-RAN WG3 NR AdHoc, Qingdao, China, Jun. 27-29, 2017, 4 pages.

Samsung, KT, "F1AP function definition and categorization", R3-172246, 3GPP TSG-RAN WG3 Meeting Ad Hoc, Qingdao, P.R. China, Jun. 27-29, 2017, 4 pages.

3rd Generation Partnership Project; Technical Specification Group Radio Access Network, "NG-RAN; Architecture description (Release 15)", 3GPP TS 38.401 V0.1.0, May 2017, 18 pages.

EP Supplementary Search Report in European Application No. EP 18788987, dated Nov. 14, 2019, 8 pages.

Nokia, Alcatel-Lucent Shanghai Bell, KT, Catt, "Interface specification and general principles for Option 3-1", R3-162730, 3GPP TSG-RAN WG3 Meeting #94, Reno, USA, Nov. 14-18, 2016, 4 pages.

* cited by examiner

METHOD AND APPARATUS FOR MODIFYING RADIO BEARER IN CU-DU SPLIT SCENARIO

CROSS-REFERENCE TO RELATED APPLICATIONS

This application claims the benefit of U.S. Provisional Application No. 62/535,944 filed on Jul. 23, 2017, the contents of which are all hereby incorporated by reference herein in their entirety.

BACKGROUND OF THE INVENTION

The present invention relates to a wireless communication system, and more particularly, to a method of modifying a radio bearer for a user equipment by a distributed unit of a base station in a scenario in which a central unit and the distributed unit are split, and an apparatus supporting the method.

Field of the Invention

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

Related Art

Meanwhile, when a radio bearer is established between a user equipment and a distributed unit (DU) of a base station, there may be need to modify the established radio bearer due to a specific situation, for example, a current radio resource situation of the DU. Therefore, the DU of the base station needs to trigger a radio bearer modification procedure to modify the established radio bearer.

SUMMARY OF THE INVENTION

According to an embodiment, there is provided a method of modifying a radio bearer for a user equipment by a distribution unit (DU) of a base station in a wireless communication system. The method may include: deciding to modify the radio bearer for the user equipment; transmitting information on the radio bearer to a central unit (CU) of the base station; receiving information on an accepted radio bearer from the CU of the base station; and modifying the accepted radio bearer.

According to another embodiment, there is provided a DU of a base station which modifies a radio bearer for a user equipment. The DU may include: a memory; a transceiver; and a processor for coupling the memory and the transceiver. The processor may be configured to: decide to modify the radio bearer for the user equipment; control the transceiver to transmit information on the radio bearer to a CU of the base station; control the transceiver to receive information on an accepted radio bearer from the CU of the base station; and modify the accepted radio bearer.

A radio bearer for a user equipment can be modified.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
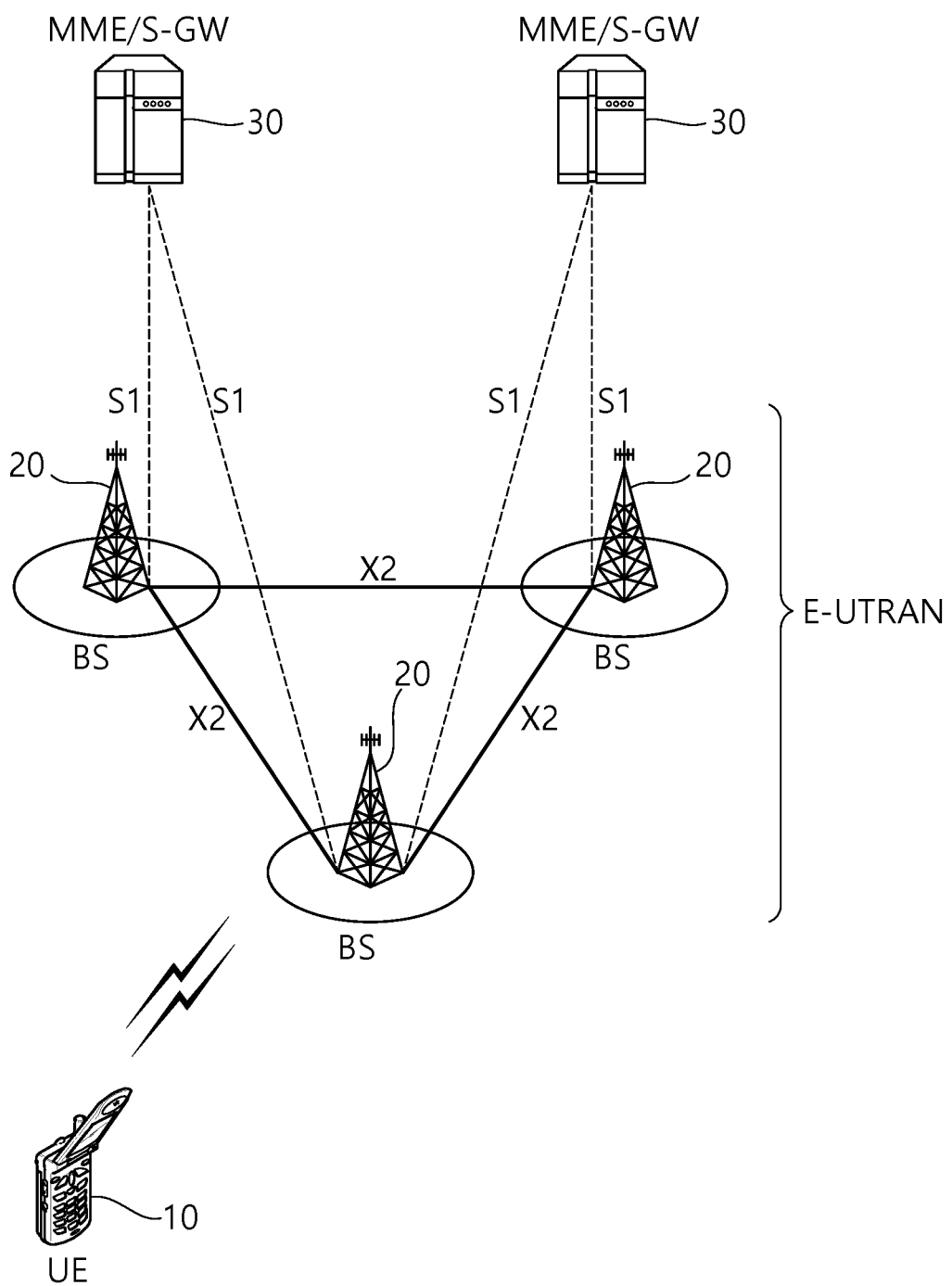
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
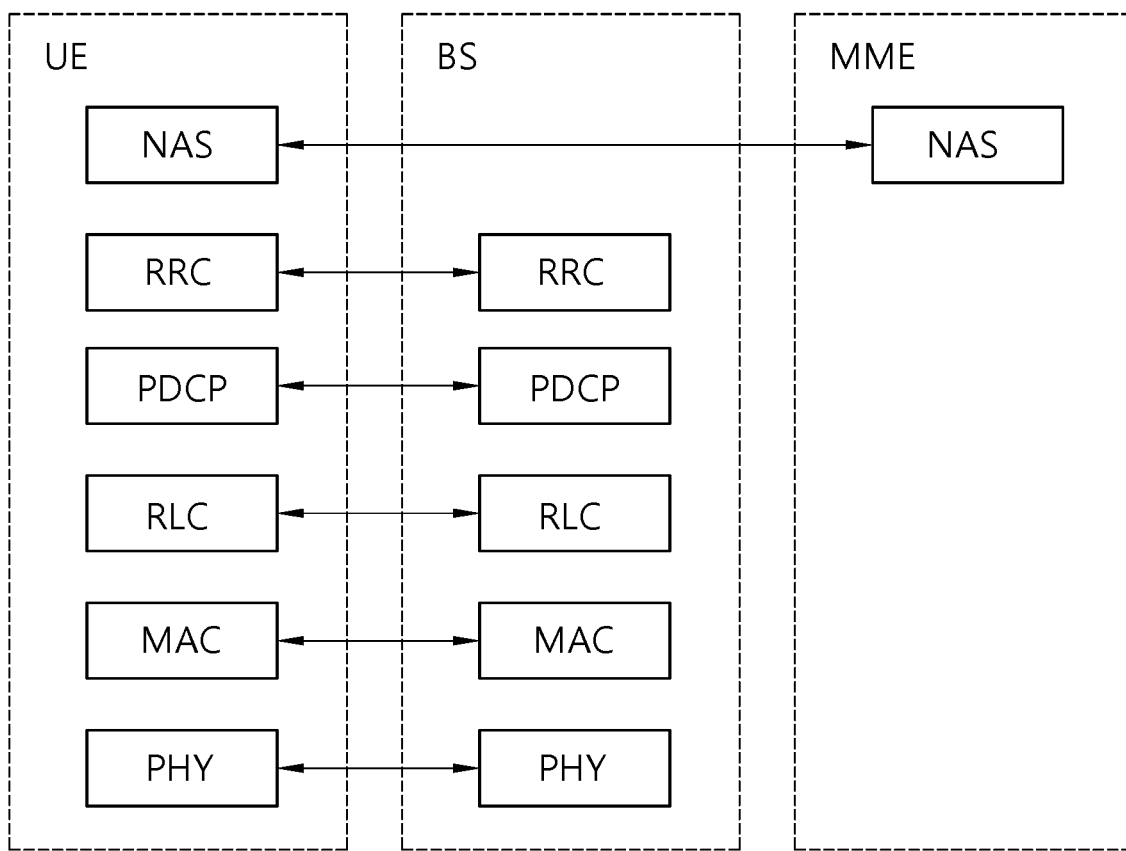
FIG. 2 shows a control plane of a radio interface protocol of an LTE system.
Figure 3:
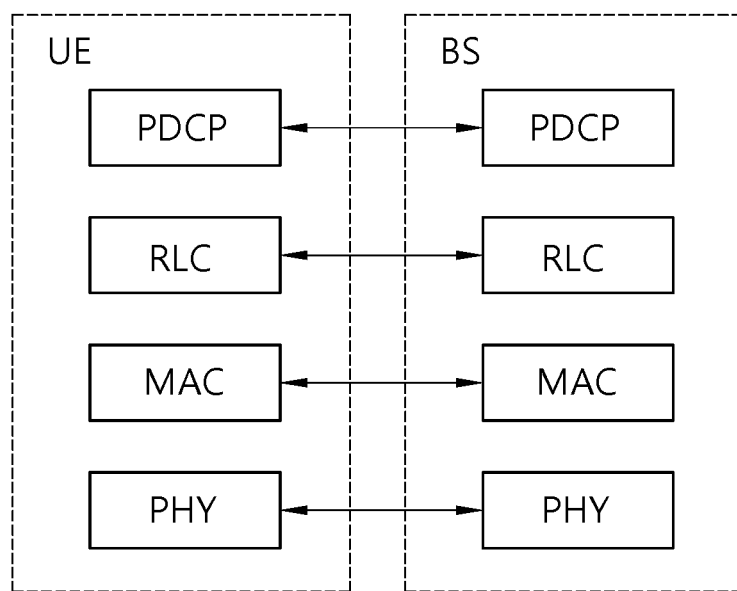
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, a 5G network structure is described.

Figure 4:
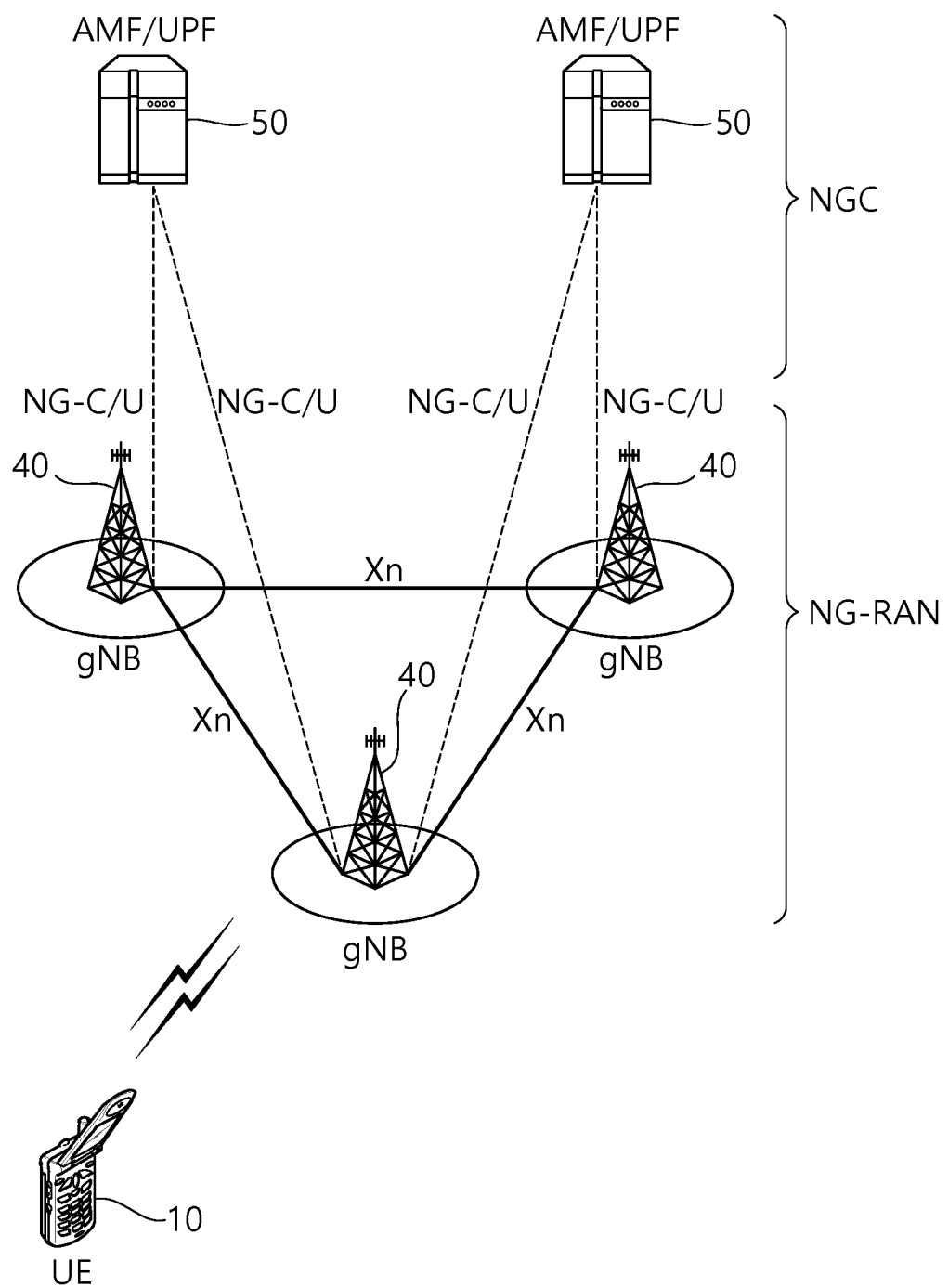
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Figure 5:
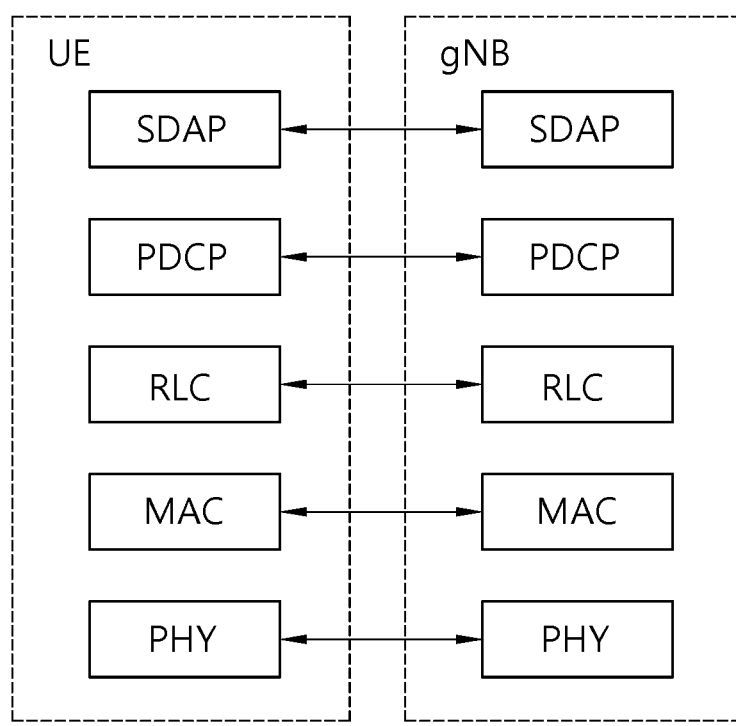
FIG. 5 shows a wireless interface protocol of a 5G system for a user plane.

FIG. 5 shows a wireless interface protocol of a 5G system for a user plane.

Referring to FIG. 5, the wireless interface protocol of the 5G system for the user plane may include a new layer called a service data adaptation protocol (SDAP) in comparison with an LTE system. A primary service and function of the SDAP layer includes mapping between quality of service (QoS) flow and a data radio bearer (DRB) and QoS flow ID (QFI) marking in both DL and UL packets. A single protocol entity of the SDAP may be configured for each individual PDU session, except for dual connectivity (DC) for which two entities can be configured.

Hereinafter, a 5G RAN deployment scenario will be described.

A 5G RAN may be classified into a 'non-centralized deployment' scenario, a 'co-sited deployment with E-UTRA' scenario, and a 'centralized deployment' scenario according to a shape of deploying a function of a BS in a central unit and a distributed unit and according to whether it coexists with a 4G BS. In this specification, the 5G RAN, a gNB, a next generation node B, a new RAN, and a new radio BS (NR BS) may imply a newly defined BS for 5G.

Figure 6:
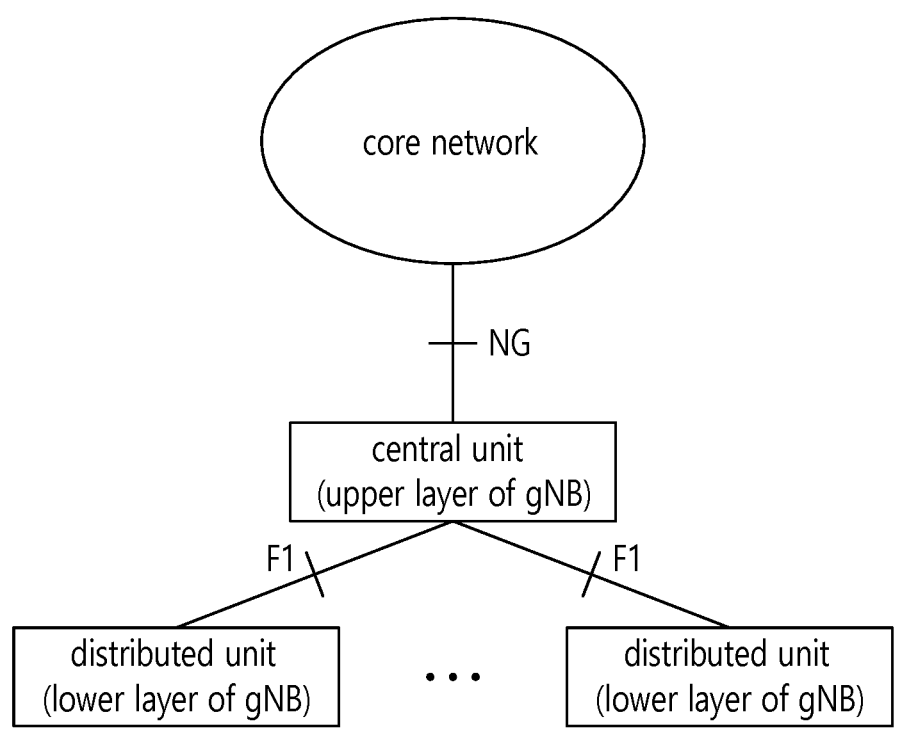
FIG. 6 shows a split-type gNB deployment (centralized deployment) scenario.

FIG. 6 shows a split-type gNB deployment (centralized deployment) scenario.

Referring to FIG. 6, a gNB may be split into a central unit and a distributed unit. That is, the gNB may be operated by being split in a layered manner. The central unit may perform a function of upper layers of the gNB, and the distributed unit may perform a function of lower layers of the gNB.

Figure 7:
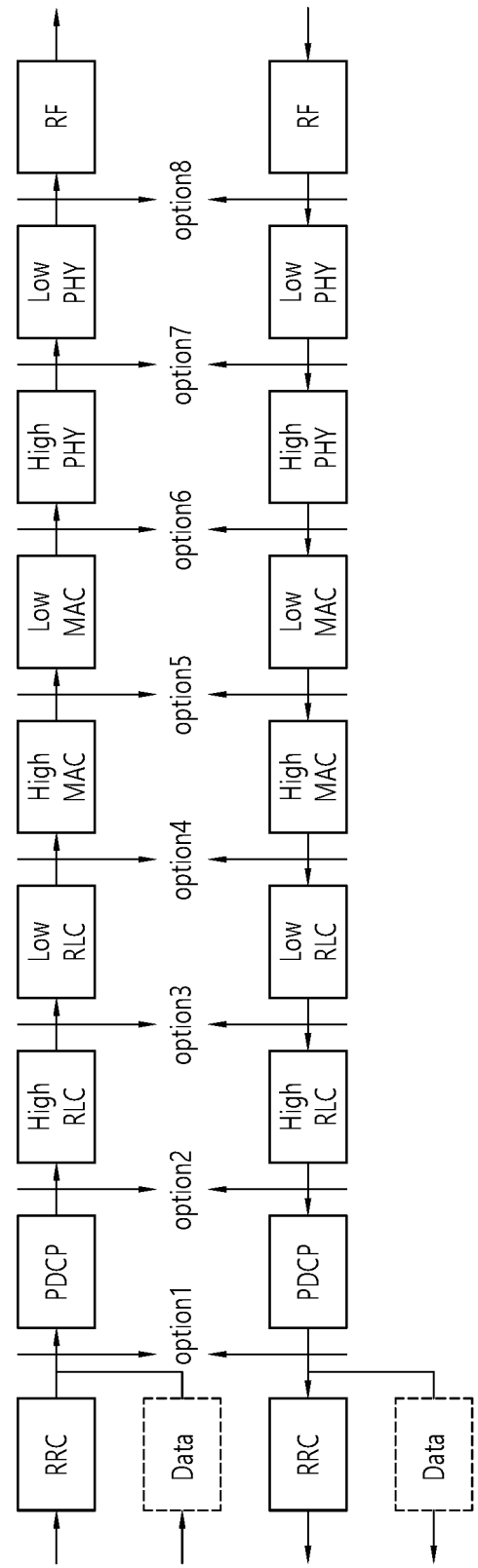
FIG. 7 shows a function split between a central unit and a distributed unit in a split-type gNB deployment scenario.

FIG. 7 shows a function split between a central unit and a distributed unit in a split-type gNB deployment scenario.

Referring to FIG. 7, in case of an option 1, an RRC layer is in a central unit, and an RLC layer, a MAC layer, a physical layer, and an RF are in a distributed unit. In case of an option 2, the RRC layer and the PDCP layer are in the central unit, and the RLC layer, the MAC layer, the physical layer, and the RF are in the distributed unit. In case of an option 3, the RRC layer, the PDCP layer, and an upper RLC layer are in the central unit, and a lower RLC layer, the MAC layer, the physical layer, and the RF are in the central unit. In case of an option 4, the RRC layer, the PDCP layer, and the RLC layer are in the central unit, and the MAC layer, the physical layer, and the RF are in the distributed unit. In case of an option 5, the RRC layer, the PDCP layer, the RLC layer, and an upper MAC layer are in the central unit, and a lower MAC layer, the physical layer, and the RF are in the distributed unit. In case of an option 6, the RRC layer, the PDCP layer, the RLC layer, and the MAC layer are in the central unit, and the physical layer and the RF are in the distributed unit. In case of an option 7, the RRC layer, the PDCP layer, the RLC layer, the MAC layer, and an upper physical layer are in the central unit, and a lower physical layer and the RF are in the distributed unit. In case of an option 8, the RRC layer, the PDCP layer, the RLC layer, the MAC layer, and the physical layer are in the central unit, and the RF is in the distributed unit.

Hereinafter, the central unit may be referred to as a CU, and the distributed unit may be referred to as a DU in the present specification. The CU may be a logical node which hosts a radio resource control (RRC), service data adaptation protocol (SDAP), and packet data convergence protocol (PDCP) layers of the gNB. The DU may be a logical node which hosts radio link control (RLC), media access control (MAC), and physical (PHY) layers of the gNB. Alternatively, the CU may be a logical node which hosts RRC and PDCP layers of an en-gNB.

In the present specification, a base station supporting the CU and the DU may be referred to as a gNB. In the present specification, an interface between the CU and the DU may be represented by F1, and an interface between the DU and the UE may be represented by Uu.

Figure 8:
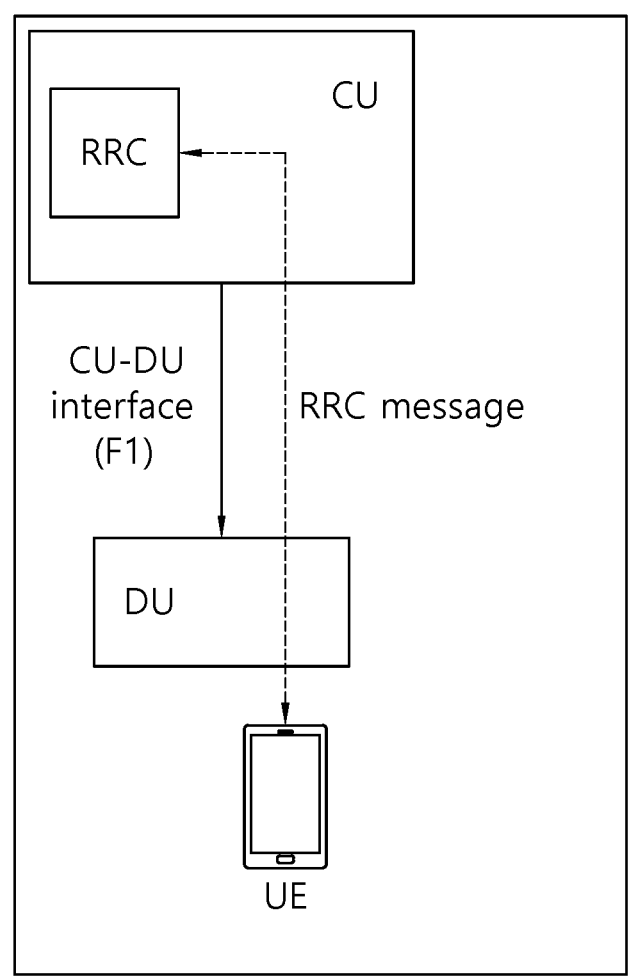
FIG. 8 shows an example of transmitting an RRC message between a CU and a UE via a DU.

FIG. 8 shows an example of transmitting an RRC message between a CU and a UE via a DU.

As described above, when a gNB supports a CU and a DU, an RRC related function is located in the CU. Referring to FIG. 8, an RRC message created by an RRC layer located in the CU of the gNB shall be transmitted to a UE via the DU. For example, the RRC message shall be transmitted to the DU through an F1 interface, and cannot be transmitted directly to the UE from the CU. Since data provided by the UE shall be transmitted to each of the UE or the CU via the DU, in order to transmit the data through the F1 interface and the Uu interface, there is a need for a method capable of carrying the data and an apparatus supporting the method.

Meanwhile, when a radio bearer is established between the UE and the gNB DU, there may be a need to modify the established radio bearer due to a specific situation, for example, a current radio resource situation of the DU. Therefore, the gNB DU may have to trigger a radio bearer modification procedure to modify the established radio bearer. Hereinafter, a method of modifying a radio bearer for the UE by the gNB DU, and an apparatus supporting the method will be described according to an embodiment of the present invention.

Figure 9:
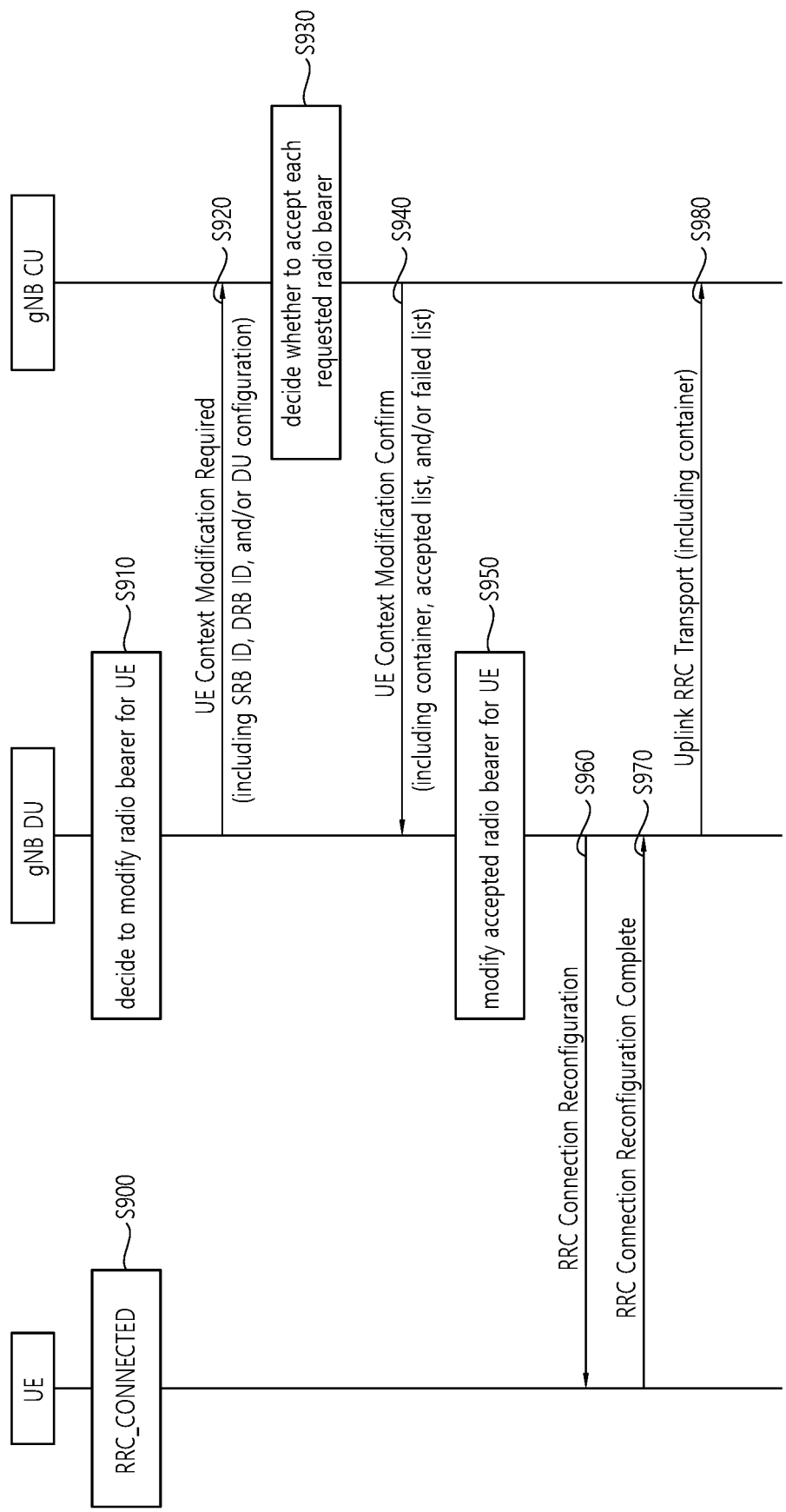
FIG. 9 shows a procedure of modifying a bearer between a UE and a DU according to an embodiment of the present invention.

FIG. 9 shows a procedure of modifying a bearer between a UE and a DU according to an embodiment of the present invention.

Referring to FIG. 9, in step S900, a UE may enter an RRC_CONNECTED state. The aforementioned base station may be a gNB.

In step S910, a DU of the gNB may decide to modify an established radio bearer between the UE and the DU. The modification of the radio bearer may be decided by the DU based on a current radio resource situation of the DU. The established radio bearer may include at least any one of SRB 1, SRB 2, or DRB. The modification of the radio bearer may include at least any one of adding the radio bearer, modifying the radio bearer, or releasing the radio bearer.

In step S920, the gNB DU may transmit to the gNB CU a Bearer Modification Indication message, a UE Context Modification Required message, or a new message. The message may include an SRB or DRB ID and a DU configuration for each requested radio bearer. The DU configuration for each requested radio bearer may include at least any one of a bearer level QoS parameter, an RLC configuration, a logical channel configuration, or a physical layer related configuration.

In step S930, upon receiving the message from the gNB DU, the gNB CU may decide whether to accept each requested radio bearer. The gNB CU may modify a parameter or configuration related to a PDCP or SDAP layer for at least one accepted radio bearer.

In step S940, the gNB CU may transmit to the gNB DU a Bearer Modification Confirm message, a Downlink RRC Transport message, a UE Context Modification Confirm message, or a new message. The message may include a container which piggybacks an RRC Connection Reconfiguration message. The message may include a list of accepted SRB or DRB. The message may include a list of failed SRB or DRB.

The list of accepted SRB or DRB may include the accepted SRB or DRB ID, and a DU configuration modified by the gNB CU. The DU configuration may include information described in step S920.

The list of failed SRB or SRB may include the failed SRB ID or DRB ID and a cause.

In step S950, upon receiving the message from the gNB CU, the gNB DU may modify an accepted radio bearer between the gNB DU and the UE. The accepted radio bearer may include at least any one of SRB 1, SRB 2, or DRB. The accepted radio bearer may be included in the list of accepted SRB or DRB. The accepted radio bearer may be modified based on a DU configuration provided by the gNB DU to the gNB CU. Alternatively, the accepted radio bearer may be modified based on the DU configuration received from the gNB CU.

On the other hand, the gNB DU may not modify the failed radio bearer between the gNB DU and the UE. The failed radio bearer may include at least any one of SRB 1, SRB 2, or DRB. The failed radio bearer may be included in the list of failed SRB or DRB.

In step S960, the gNB DU may transfer the RRC Connection Reconfiguration message to the UE.

In step S970, the UE may transmit an RRC Connection Reconfiguration Complete message to the gNB DU.

In step S980, upon receiving the message from the UE, the gNB DU may transmit to the gNB CU an Uplink RRC Transport message or new message including a container which piggybacks the RRC Connection Reconfiguration Complete message.

According to an embodiment of the present invention, in order to add, modify, or release a radio bearer between the gNB DU and the UE, the gNB DU may provide the gNB CU with information related to a bearer to be modified based on a current radio resource state thereof. That is, the adding, modifying, or releasing of the radio bearer may be initiated by the gNB DU. Thereafter, the gNB CU may provide information related to an accepted radio bearer and/or a failed radio bearer to the gNB DU and the UE. Therefore, the radio bearer between the gNB DU and the UE may be added, modified, or released, and the RRC message may be transferred between the gNB DU and the UE based on the modified radio bearer.

Figure 10:
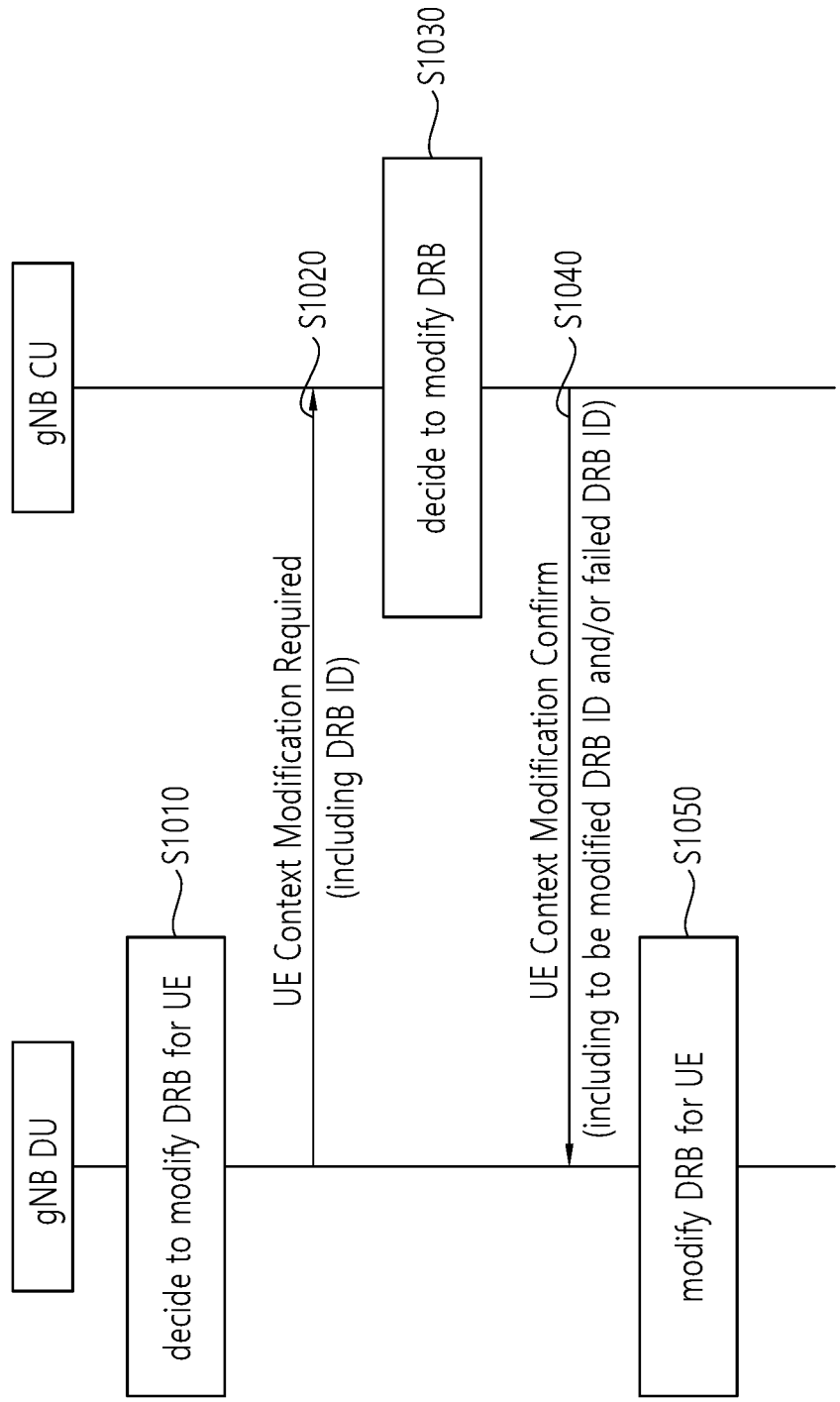
FIG. 10 shows a procedure of modifying a DRB between a UE and a DU according to an embodiment of the present invention.

FIG. 10 shows a procedure of modifying a DRB between a UE and a DU according to an embodiment of the present invention.

Referring to FIG. 10, in step S1010, a gNB DU may decide to modify UE context established between the UE and the DU. For example, the gNB DU may decide to modify a DRB for the UE. For example, the gNB DU may decide to release a DRB for the UE. The DRB may be radio bearer resources for the UE.

In step S1020, if the gNB DU decides to modify the DRB, the gNB DU may transmit a UE Context Modification Required message to the gNB CU. The UE Context Modification Required message may be a message which requests for the modification of the UE context. The UE Context Modification Required message may include a DRB Required to Be Modified List, and the DRB Required to Be Modified List may include a DRB ID.

In step S1020, if the gNB DU decides to release the DRB, the gNB DU may transmit a UE Context Modification Required message to the gNB CU. The UE Context Modification Required message may include a DRB Required to be Released List, and the DRB Required to be Released List may include a DRB ID.

For example, the UE Context Modification Required message transmitted by the gNB DU to the gNB CU may be defined by Table 1.

TABLE 1

| IE/Group Name | Presence | Criticality | Assigned Criticality |
|---|---|---|---|
| Message Type | M | YES | reject |
| gNB-CU UE F1AP ID | M | YES | reject |

TABLE 1-continued

| IE/Group Name | Presence | Criticality | Assigned Criticality |
|---|---|---|---|
| gNB-DU UE F1AP ID | M | YES | reject |
| Resource Coordination Transfer Container | O | YES | ignore |
| DU To CU RRC Information | O | YES | reject |
| DRB Required to Be Modified List | | EACH | reject |
| >DRB Required to Be Modified Item IEs | | EACH | reject |
| >>DRB ID | M | — | |
| >>DL Tunnels to be setup List | | | |
| >>>DL Tunnels to Be Setup Item IEs | | | |
| >>>>DL GTP Tunnel Endpoint | M | — | — |
| SRB Required to be Released List | | EACH | reject |
| >SRB Required to be Released List Item IEs | | EACH | reject |
| >>SRB ID | M | — | |
| DRB Required to be Released List | | EACH | reject |
| >DRB Required to be Released List Item IEs | | EACH | reject |
| >>DRB ID | M | — | |
| Cause | M | YES | ignore |

In addition, the UE Context Modification Required message may include a DU configuration for DRB. The DU configuration for DRB may include at least any one of a bearer level QoS parameter, an RLC configuration, a logical channel configuration, or a physical layer related configuration.

In step S1030, upon receiving the UE Context Modification Required message from the gNB DU, the gNB CU may decide to modify the DRB.

In step S1040, the gNB CU may transmit a UE Context Modification Confirm message to the gNB DU. The UE Context Modification Confirm message may be transmitted to allow the gNB CU to report whether modification is possible to the gNB DU. For example, the UE Context Modification Confirm message may be transmitted to allow the gNB CU to report a successful modification to the gNB DU.

The UE Context Modification Confirm message may include a DRB Modified list, and the DRB Modified list may include a DRB ID. That is, the gNB CU may transmit to the gNB DU a list of a DRB which is successfully modified.

In addition, the UE Context Modification Confirm message may include a DRB Failed to be Modified List, and the DRB Failed to be Modified List may include a DRB ID. That is, the gNB CU may transmit the list of DRBs which are failed to be modified to the gNB CU. In this case, the DRB Failed to be Modified List may include a failure cause.

For example, the UE Context Modification Confirm message transmitted by the gNB CU to the gNB DU may be defined by Table 2.

TABLE 2

| IE/Group Name | Presence | Semantics description | Criticality | Assigned Criticality |
|---|---|---|---|---|
| Message Type | M | | YES | reject |
| gNB-CU UE F1AP ID | M | | YES | reject |
| gNB-DU UE F1AP ID | M | | YES | reject |
| Resource Coordination Transfer Container | O | Includes the MeNB Resource Coordination Information IE | YES | ignore |
| DRB Modified List | | The List of DRBs which are successfully modified. | YES | ignore |
| >DRB Modified Item IEs | | | EACH | ignore |
| >>DRB ID | M | | — | |
| >>UL Tunnels to be | | | | |

TABLE 2-continued

| IE/Group Name | Presence | Semantics description | Criticality | Assigned Criticality |
|---|---|---|---|---|
| setup List | | | | |
| >>>UL Tunnels to Be Setup Item IEs | | | | |
| >>>>UL GTP Tunnel Endpoint | M | gNB-DU endpoint of the F1 transport bearer. For delivery of UL PDUs. | | |
| DRB Failed to be Modified List | | The list of DRBs which are failed to be modified. | YES | ignore |
| >DRB Failed to be Modified Item IEs | | | EACH | ignore |
| >>DRB ID | M | | — | — |
| >>Cause | O | | — | — |
| Criticality Diagnostics | O | | YES | ignore |

In step S1050, upon receiving the UE Context Modification Confirm message from the gNB CU, the gNB DU may modify a DRB included in a DRB Modified list. Otherwise, the gNB DU may not modify a DRB included in a DRB Failed to be Modified list. In addition, the gNB DU may release the DRB included in the DRB Required to be Released list.

Figure 11:
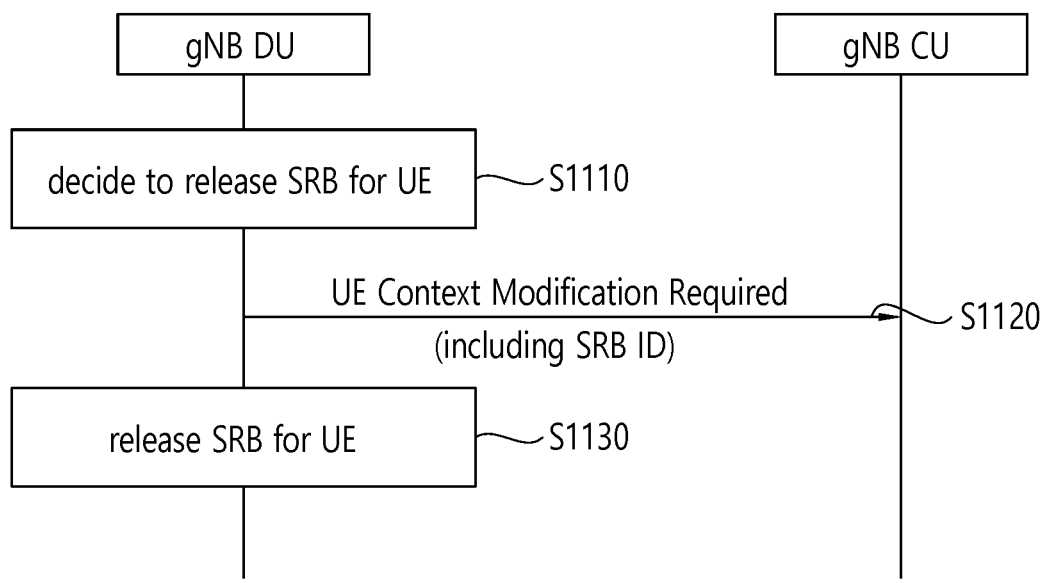
FIG. 11 shows a procedure of releasing an SRB between a UE and a DU according to an embodiment of the present invention.

FIG. 11 shows a procedure of releasing an SRB between a UE and a DU according to an embodiment of the present invention.

Referring to FIG. 11, in step S1110, a gNB DU may decide to modify UE context established between a UE and a DU. For example, the gNB DU may decide to release an SRB for the UE.

In step S1120, if the gNB DU decides to release the SRB, the gNB DU may transmit a UE Context Modification Required message to the gNB CU. The UE Context Modification Required message may be a message which requests to modify the UE context. The UE Context Modification Required message may include an SRB Required to be Released list, and the SRB Required to be Released list may include an SRB ID. For example, the UE Context Modification Required message transmitted by the gNB DU to the gNB CU may be defined by Table 1 above.

In step S1130, after transmitting the UE Context Modification Required message to the gNB CU, the gNB DU may release an SRB included in the SRB Required to be Released list.

Figure 12:
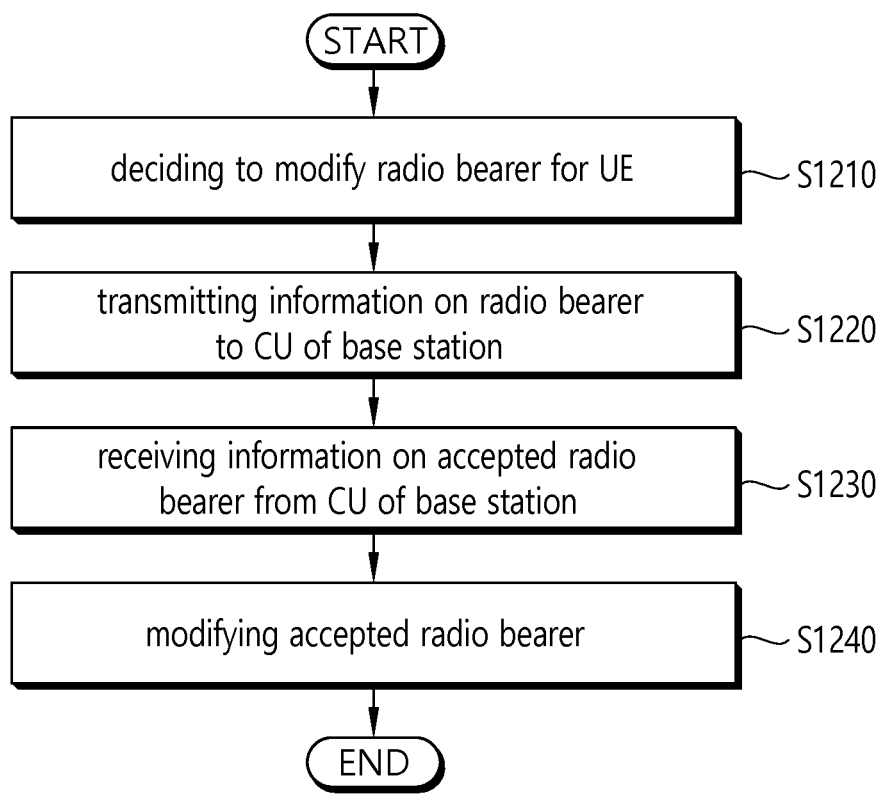
FIG. 12 is a block diagram illustrating a method of modifying a radio bearer for a UE by a DU of a base station according to an embodiment of the present invention.

FIG. 12 is a block diagram illustrating a method of modifying a radio bearer for a UE by a DU of a base station according to an embodiment of the present invention.

Referring to FIG. 12, in step S1210, the DU of the base station may decide to modify the radio bearer for the UE. The radio bearer may be a data radio bearer (DRB) or a signaling radio bearer (SRB). It may be decided to modify the radio bearer for the UE based on a current radio resource situation of the DU.

In step S1220, the DU of the base station may transmit information on the radio bearer to a CU of the base station. The information on the radio bearer may include a list of a radio bearer which is required to be modified. The list of the radio bearer which is required to be modified may include an ID of the radio bearer which is required to be modified.

The information on the radio bearer may be included in a UE Context Modification Required message and may be transmitted from the DU of the base station to the CU.

In step S1230, the DU of the base station may receive information on an accepted radio bearer from the CU of the base station. The information on the accepted radio bearer may include a list of a radio bearer which is accepted. In other words, the information on the accepted radio bearer may include a list of a radio bearer which is successfully modified. The list of the accepted radio bearer may include an ID of the accepted radio bearer.

The information on the accepted radio bearer may be included in a UE Context Modification Confirm message and may be transmitted from the CU of the base station to the DU.

The accepted radio bearer may be a radio bearer accepted by the CU of the base station among the radio bearers.

In step S1240, the DU of the base station may modify the accepted radio bearer.

In addition, the DU of the base station may receive information on a failed radio bearer from the CU of the base station. The information on the failed radio bearer may include a cause. The information on the failed radio bearer may include a list of a radio bearer which is failed to be modified. The list of the radio bearer which is failed to be modified may include an ID of the radio bearer which is failed to be modified.

In addition, the DU of the base station may transmit a DU configuration for the radio bearer including at least any one of a bearer level QoS parameter, an RLC configuration, a logical channel configuration, or a physical layer related configuration to the CU of the base station.

Figure 13:
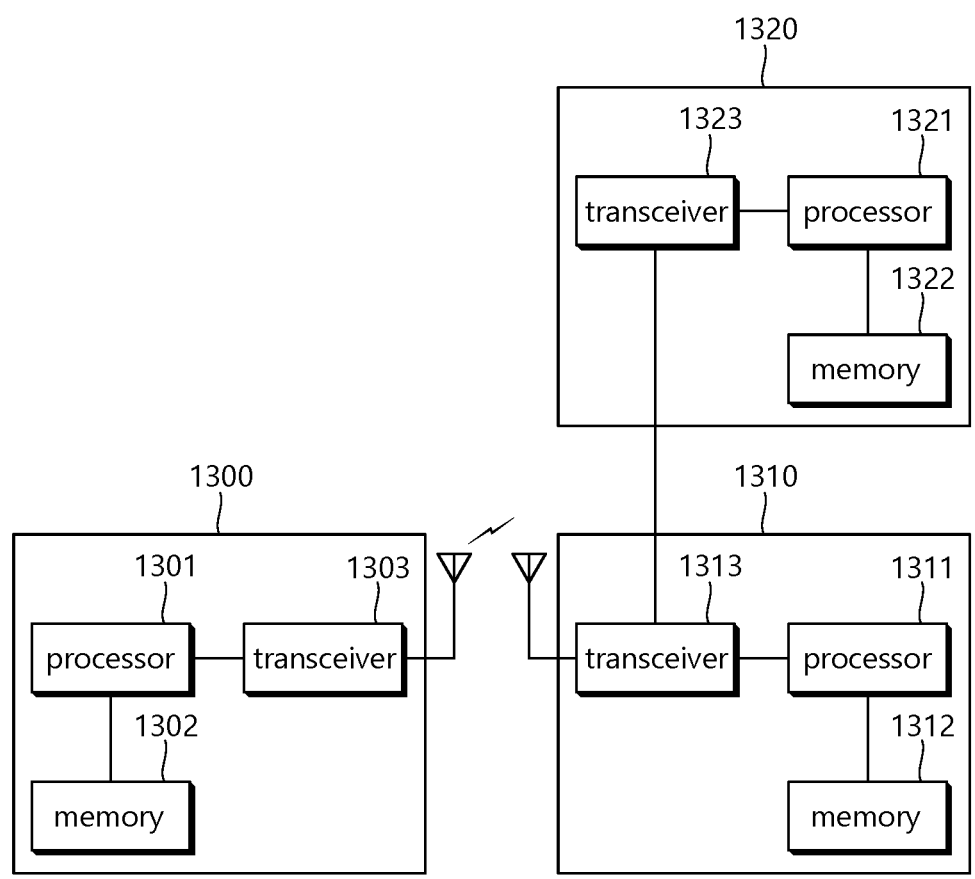
FIG. 13 is a block diagram illustrating a wireless communication system according to the embodiment of the present invention.

FIG. 13 is a block diagram illustrating a wireless communication system according to the embodiment of the present invention.

A UE 1300 includes a processor 1301, a memory 1302 and a transceiver 1303. The memory 1302 is connected to the processor 1301, and stores various information for driving the processor 1301. The transceiver 1303 is connected to the processor 1301, and transmits and/or receives radio signals. The processor 1301 implements proposed functions, processes and/or methods. In the above embodiment, an operation of the user equipment may be implemented by the processor 1301.

A DU of a base station 1310 includes a processor 1311, a memory 1312 and a transceiver 1313. The memory 1312 is connected to the processor 1311, and stores various information for driving the processor 1311. The transceiver 1313 is connected to the processor 1311, and transmits and/or receives radio signals. The processor 1311 implements proposed functions, processes and/or methods. In the above embodiment, an operation of the DU may be implemented by the processor 1311.

A CU of the base station 1320 includes a processor 1312, a memory 1322 and a transceiver 1323. The memory 1322 is connected to the processor 1321, and stores various information for driving the processor 1321. The transceiver 1323 is connected to the processor 1321, and transmits and/or receives radio signals. The processor 1321 implements proposed functions, processes and/or methods. In the above embodiment, an operation of the CU may be implemented by the processor 1321.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of modifying a radio bearer for a user equipment by a distribution unit (DU) of a base station in a wireless communication system, the method comprising:
    determining a plurality of radio bearers for which modification is to be requested for the user equipment;
    transmitting, to a central unit (CU) of the base station, a first message requesting modification of the plurality of radio bearers, wherein the first message comprises radio bearer identifiers corresponding to the plurality of radio bearers that are requested to be modified;
    based on successful radio bearer modification by the CU:
        receiving, from the CU, a second message comprising a list of radio bearer identifiers corresponding to at least one accepted radio bearer, from among the plurality of radio bearers, that has been accepted by the CU for modification; and
        based on receiving the second message, modifying the at least one accepted radio bearer; and
    based on unsuccessful radio bearer modification by the CU:
        receiving, from the CU, information regarding a failure cause for the unsuccessful radio bearer modification by the CU.

2. The method of claim 1, further comprising:
    based on the unsuccessful radio bearer modification by the CU: receiving information regarding a list of at least one radio bearer for which modification fails.

3. The method of claim 2, wherein the information regarding the list of at least one radio bearer for which modification fails comprises information regarding an ID of the at least one radio bearer for which modification fails.

4. The method of claim 1, wherein the plurality of radio bearers comprises a data radio bearer (DRB) or a signaling radio bearer (SRB).

5. The method of claim 1, wherein the first message is a UE Context Modification Required message and is transmitted from the DU of the base station to the CU, and
    wherein the second message is a UE Context Modification Confirm message that is transmitted from the CU of the base station to the DU.

6. The method of claim 1, further comprising:
    transmitting, to the CU of the base station, information regarding a DU configuration for the radio bearer, wherein the DU configuration for the radio bearer comprises at least one of a bearer level QoS parameter, an RLC configuration, a logical channel configuration, or a physical layer related configuration.

7. The method of claim 1, wherein determining the plurality of radio bearers for which modification is to be requested for the user equipment is performed based on a current radio resource situation of the DU.

8. A distribution unit (DU) of a base station configured to modify a radio bearer for a user equipment, the DU comprising:
    a transceiver;
    at least one processor; and
    at least one computer memory operably connectable to the at least one processor and storing instructions that, when executed by the at least one processor, perform operations comprising:
    determining a plurality of radio bearers for which modification is to be requested for the user equipment;
    transmitting, a central unit (CU) of the base station, a first message requesting modification of the plurality of radio bearers, wherein the first message comprises radio bearer identifiers corresponding to the plurality of radio bearers that are requested to be modified;
    based on successful radio bearer modification by the CU:
        receiving, from the CU of the base station, a second message comprising a list of radio bearer identifiers corresponding to at least one accepted radio bearer, from among the plurality of radio bearers, that has been accepted by the CU for modification; and
        based on receiving the second message, modifying the at least one accepted radio bearer; and
    based on unsuccessful radio bearer modification by the CU:
        receiving, from the CU, information regarding a failure cause for the unsuccessful radio bearer modification by the CU.

9. The method of claim 1, wherein determining the plurality of radio bearers for which modification is to be requested for the user equipment is performed for the user equipment in an RRC_CONNECTED state.

10. The method of claim 1, wherein the second message received from the CU further comprises a container that includes an RRC Connection Reconfiguration message.

11. The method of claim 10, further comprising:
forwarding, to the user equipment, the RRC Connection Reconfiguration message that was included in the container in the second message received from the CU.

12. A method of modifying a radio bearer for a user equipment by a central unit (CU) of a base station in a wireless communication system, the method comprising:
receiving, from a distribution unit (DU) of the base station, a first message requesting modification of a plurality of radio bearers for the user equipment, wherein the first message comprises radio bearer identifiers corresponding to the plurality of radio bearers that are requested to be modified;
based on successful radio bearer modification by the CU:
selecting, from among the plurality of radio bearers, at least one accepted radio bearer that is accepted by the CU for modification; and
transmitting, to the DU of the base station, a second message comprising a list of radio bearer identifiers corresponding to the at least one accepted radio bearer, from among the plurality of radio bearers, that has been accepted by the CU for modification; and
based on unsuccessful radio bearer modification by the CU:
transmitting, to the DU, information regarding a failure cause for the unsuccessful radio bearer modification by the CU.

13. The DU of claim 8, wherein the operations further comprise:
transmitting, to the CU of the base station, information regarding a DU configuration for the radio bearer, wherein the DU configuration for the radio bearer comprises at least one of a bearer level QoS parameter, an RLC configuration, a logical channel configuration, or a physical layer related configuration.

14. The DU of claim 8, wherein determining the plurality of radio bearers for which modification is to be requested for the user equipment is performed for the user equipment in an RRC_CONNECTED state.

15. The DU of claim 8, wherein the second message received from the CU further comprises a container that includes an RRC Connection Reconfiguration message.

16. The DU of claim 15, wherein the operations further comprise:
forwarding, to the user equipment, the RRC Connection Reconfiguration message that was included in the container in the second message received from the CU.

17. The method of claim 12, further comprising:
receiving, from the DU of the base station, information regarding a DU configuration for the radio bearer, wherein the DU configuration for the radio bearer comprises at least one of a bearer level QoS parameter, an RLC configuration, a logical channel configuration, or a physical layer related configuration.

18. The method of claim 12, wherein the plurality of radio bearers for which modification is to be requested for the user equipment is determined for the user equipment in an RRC_CONNECTED state.

19. The method of claim 12, wherein the second message transmitted to the DU further comprises a container that includes an RRC Connection Reconfiguration message.

* * * * *